G. T. PERKINS.
Car-Couplings.
No. 158,731.  Patented Jan. 12, 1875.
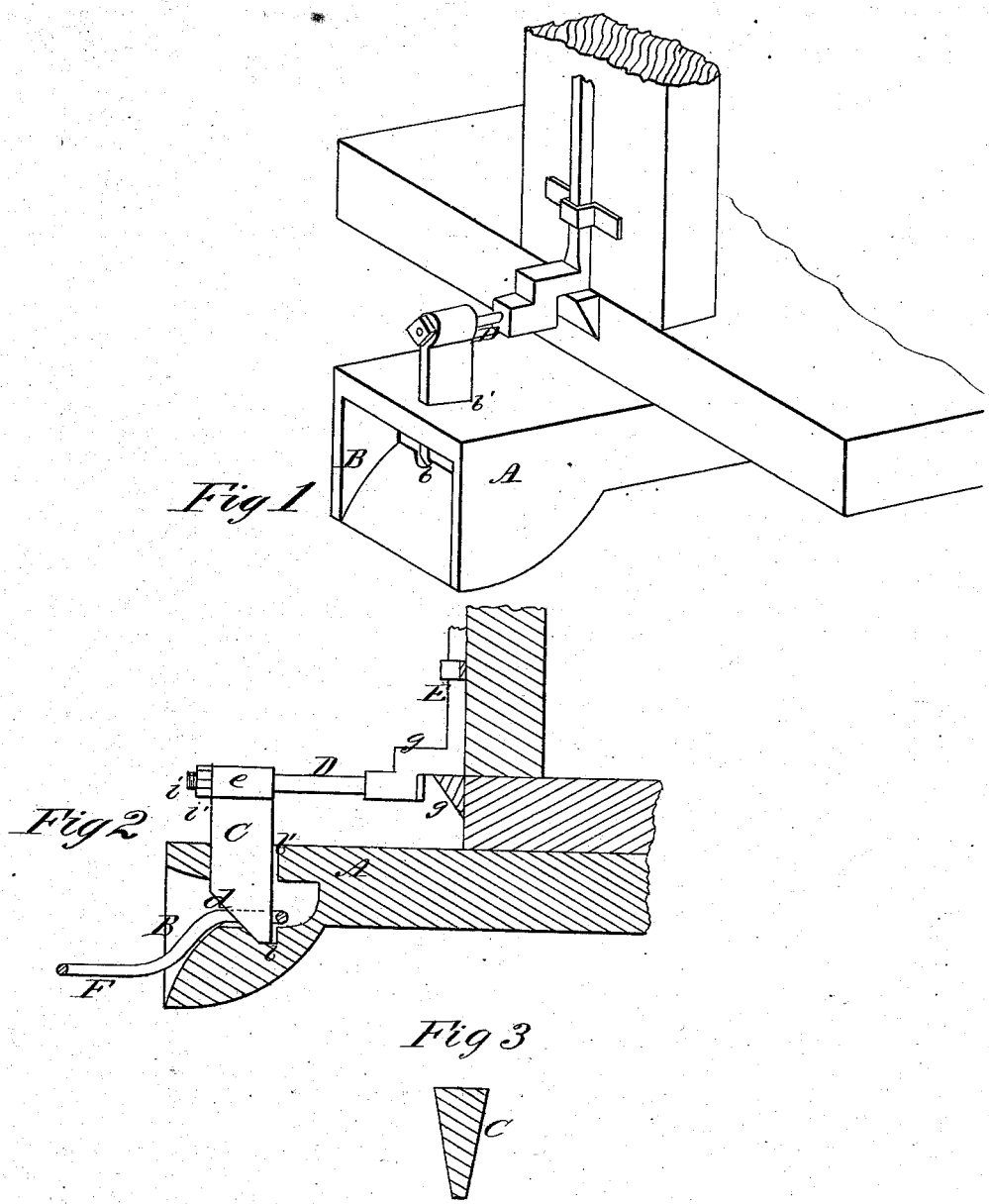

UNITED STATES PATENT OFFICE.

GEORGE T. PERKINS, OF ST. ELMO, ILLINOIS.

IMPROVEMENT IN CAR-COUPLINGS.

Specification forming part of Letters Patent No. 158,731, dated January 12, 1875; application filed December 14, 1874.

*To all whom it may concern:*

Be it known that I, GEORGE T. PERKINS, of St. Elmo, in the county of Fayette and State of Illinois, have invented certain new and useful Improvements in Car-Couplings; and I do hereby declare the following to be a full, clear, and exact description of the invention, such as will enable others skilled in the art to which it pertains to make and use it, reference being had to the accompanying drawings, which form part of this specification, in which—

Figure 1 is a perspective view of my improvement. Fig. 2 is a vertical longitudinal section, and Fig. 3 a detail view.

This invention has for its object the provision of a simple and effective means of automatically coupling cars; and it consists in the novel construction and combination of parts, comprising, severally, a bell-mouthed drawhead, having a recess in its lower interior surface to receive the coupling-pin; a heavy coupling-pin, sliding vertically through a slot in the top of the draw-head, beveled at its lower end, so as to yield and rise from pressure of the link, made tapering or wedge-shaped in cross-section, so as to allow free vibration of the link while retaining sufficient strength, and formed with an elongated eye for the passage of a threaded rod, upon which the pin is hung, and upon which it may be adjusted to suit different cars, and a vertically-moving uncoupling-bar, all as hereinafter specified.

Referring to the acompanying drawing, A designates the draw-head, having a bell-mouth, B, a recess at *b*, and a slot at *b'*. C designates the coupling-pin, having the elongated eye *e*, by which it is suspended from a horizontal rod, D. The normal position of the pin is with its lower end in the recess *b*. The forward portion of the lower end is beveled at *d*, so that when the link is pressed against it the pin will rise automatically, allowing the link to pass into the head, after which the pin will drop and secure said link. The pin is made wedge-shaped in cross-section, as clearly shown in Fig. 3, its sides converging from back to front.

In this form the pin is strong, resisting the strain brought to bear against its thickest part, while allowing the link sufficient freedom of vibration to correspond to the movements of the train.

The object of the rod D is to connect the pin to the uncoupling-rod E. The rod D is threaded at *i*, and holds a nut, *i'*, by turning which the pin may be readily adjusted. The rod E has a shoulder, *g*, which rests upon a step at *g'*, and prevents the pin from sagging or binding. F designates a bent link, by which cars of different heights may be coupled.

I claim as new and desire to secure by Letters Patent—

The combination of the beveled adjustable gravity-pin C, having the eye *e*, the horizontal threaded rod D, passing through said eye, and holding the nut *i'*, and the uncoupling-rod E, all constructed to operate as described.

In testimony that I claim the foregoing I have hereunto set my hand this 4th day of December, 1874.

GEORGE T. PERKINS.

Witnesses:
JOHN W. KNEISLY,
H. H. KOSTER.